F. CULTER.
SAFETY STEERING DEVICE FOR AUTOMOBILES.
APPLICATION FILED JAN. 22, 1915.
1,250,287.
Patented Dec. 18, 1917.
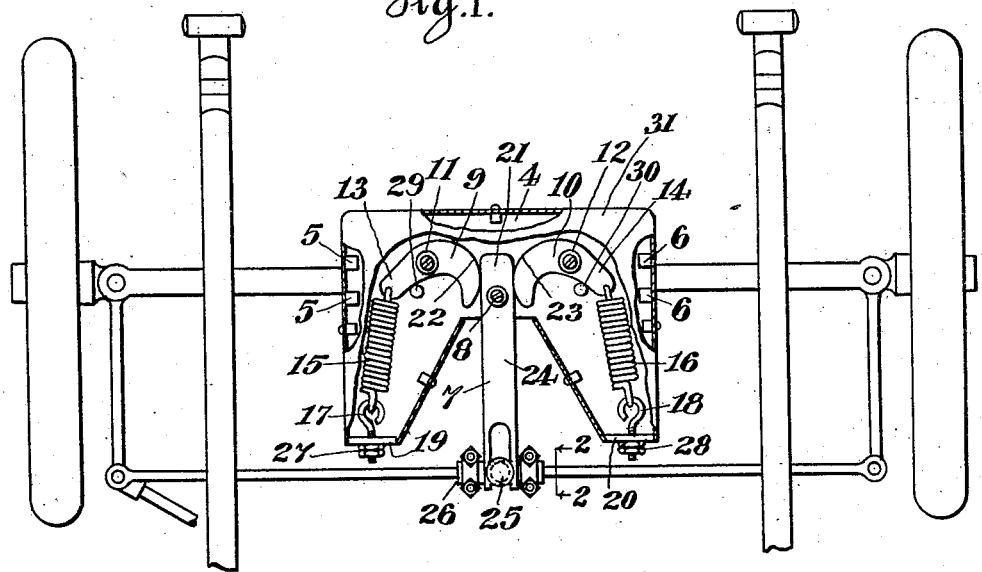
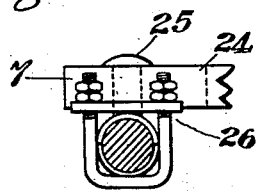
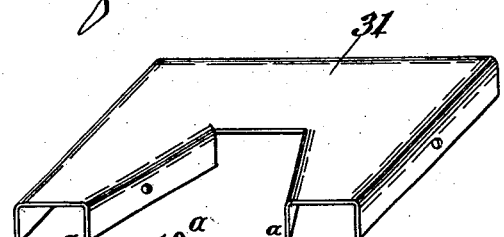
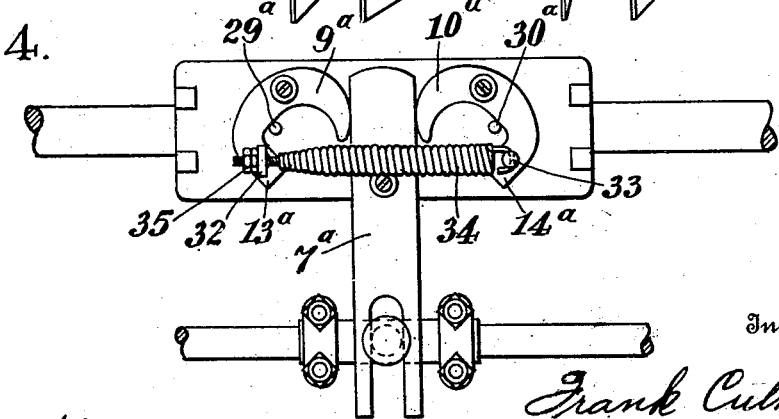

UNITED STATES PATENT OFFICE.

FRANK CULTER, OF CINCINNATI, OHIO.

SAFETY STEERING DEVICE FOR AUTOMOBILES.

1,250,287.  Specification of Letters Patent.  Patented Dec. 18, 1917.

Application filed January 22, 1915. Serial No. 3,829.

*To all whom it may concern:*

Be it known that I, FRANK CULTER, a citizen of the United States of America, and resident of Cincinnati, county of Hamilton, State of Ohio, have invented certain new and useful Improvements in Safety Steering Devices for Automobiles, of which the following is a specification.

This invention relates to improvements in safety steering devices for automobiles and particularly to safety devices adapted for use on automobiles of cheap construction, wherein the steering mechanism is operated through a rack and pinion or similar mechanism. In the running of such automobiles, the operator is obliged to grasp the steering wheel very firmly in order to keep the vehicle in the center of the road, because of the tendency in such steering gear constructions, for the steering wheel to be wrenched from the hands of the operator when the wheels of the vehicle encounter obstructions on the road surface. In addition to this, such a tendency sets up undue shocks in certain portions of the steering mechanism and for this reason tends to weaken and eventually break certain portions of the steering mechanism. The result of this would be to cause the car to leave the road and thus cause a serious accident.

Therefore an object of my invention is to produce a safety steering device in which the front wheels will be yieldingly maintained in their proper positions with relation to the axis of the car, should the steering wheel be wrenched from the driver's grasp, or should the steering mechanism become broken the wheels will be held to their normal positions, thereby preventing the car from leaving the road so that it may be brought to a stop without any serious accident occurring.

A further object of my invention is to provide a steering device which will enable the vehicle to be much more easily steered, and which is much simpler in construction as well as cheaper to manufacture, than other similar devices known to me.

These and other objects are attained in the apparatus described in the following specification and illustrated in the accompanying drawings, in which;

Figure 1 is a fragmental plan view of a front portion of a vehicle chassis with a device embodying my invention mounted thereon.

Fig. 2 is a sectional view taken on the line 2—2 of Fig. 1.

Fig. 3 is a perspective view of the cover employed in protecting the operating parts of my device against dirt and moisture, as well as against accidental breakage or disarrangement.

Fig. 4 is plan view of a modified form of my invention, showing the device mounted on an axle and in operative connection with the reach rod of the steering mechanism of an automobile.

The device forming the principal embodiment of my invention and illustrated in Figs. 1 to 3 inclusive, consists of a bed plate 4 having bolts 5 and 6 adapted to secure the plate in position on the front axle of a motor vehicle, a lever 7 pivotally mounted on a stud 8 secured to the bed plate, and cam shaped dogs or eccentrics 9 and 10, which are pivotally mounted on studs 11 and 12 extending from the base plate 4. These eccentrics are provided with rearwardly extending arms 13 and 14 which are provided with apertures adapted to receive the ends of coiled springs 15 and 16, the opposite ends of which connect with adjustable bolts 17 and 18 mounted in upturned extensions 19 and 20 of the bed plate. The lever 7 is pivotally mounted upon the stud 8 in such a manner as to provide a short lever arm 21 adapted to engage the cam faces 22 and 23 of the eccentrics or cams 9 and 10, and a relatively long lever arm 24 which extends rearwardly of the machine and is slotted to engage a headed pin 25 mounted on a clamp member 26 secured to the reach rod connecting the steering knuckles of the steering wheels. The construction of this clamp and the position it occupies with relation to the reach rod is more clearly disclosed in Fig. 2.

The adjustment bolts 17 and 18 adapted to regulate the tension of the respective springs 15 and 16, are provided with lock nuts 27 and 28 which secure the springs after proper adjustment thereof has been made. The purpose of providing such a construction is to enable the operator to change the tension of the springs to accommodate the device to the different cars to which it may be attached. In order that the operation of the device may be such that the springs will not balance one another, that is, in order that but one cam may operate at a time to return the vehicle wheels to the straight ahead position disclosed in the drawings, pins 29 and 30 have been provided to extend upwardly from the base plate 4 and into engagement with the rear faces of the arms 13 and 14 of the cams.

In the modified form of my invention illustrated in Fig. 4, the spring arms 13ª and 14ª are extended somewhat toward one another, and are provided with posts 32 and 33 adapted to support a single spring 34 which operates upon both the cams 9ª and 10ª to retain them in position against the sides of the lever 7ª. This spring is secured to the post 33 by having its hooked end passed through an opening in the post, the opposite end of the spring being passed through an opening in the post 32 and threaded to receive lock nuts 35.

In operation;

When the wheels are turned to direct the vehicle to one side or the other, the lever 7 will be moved and cause but one cam at a time to be operated, the other cam remaining stationary in engagement with its abutment pin. In this manner, return of the wheels to their straight ahead position is positively assured, since the inactive cam and spring can in no way interfere with or neutralize the effect of the acting spring and cam, to return the wheels to their normal position. This is true no matter which way the vehicle wheels may be directed.

Should it be desired to direct the vehicle to the left, the operator will operate the steering wheel of the machine in such a manner as to cause the reach rod connecting the steering knuckles to move the lever arm 24 of the lever 7, to the right, thereby causing the short lever arm 21 to move the cam 9 backwardly and the spring arm 13 of the cam to be moved forwardly. This extends the spring 15 and causes it to exert an increased tension upon the arm 13, cam 9, short lever arm 21, long lever arm 24, and through the pin 25, clamp 26, and the connected steering mechanism, to tend to return the wheels to their normal straight ahead position. With the parts in this above described position, the cam 10 remains at rest with its spring arm 14 in engagement with the abutment pin 30, thereby preventing the cam from engaging the short lever arm 21 of the lever 7, while it remains in this position. When the steering mechanism is moved to direct the vehicle to the right, the cam 10 will be operated upon by the short lever arm 21, and the spring 16 will be extended, while the spring arm 13 of the cam 9 will be retained by the spring 15 against its abutment pin 29, thereby holding the cam 9 out of engagement with the short lever arm 21 and permitting the spring 16 to exert its entire force to return the wheels to their normal position. A suitable cover 31 has been provided for protecting the mechanism of the safety steering device from accidental disarrangement or breakage because of stones and other objects being thrown from the road surface, as well as to protect the operating parts of the device from dirt and weather conditions which would tend to damage or render the device inoperative.

In the modified form of my invention illustrated in Fig. 4, the cams 9ª and 10ª coöperate with the lever 7ª in the same manner that the cams 9 and 10 of the construction illustrated in Fig. 1, coöperate with the lever 7. The single spring 34 of the modified construction operates in much the same manner as the two springs 15 and 16 of the construction illustrated in Fig. 1, the spring being extended, however, from first one end and then the opposite end as the cams 9ª and 10ª are alternately operated. Pins 29ª and 30ª have been provided and perform the same functions as the pins 29 and 30 of the construction illustrated in Fig. 1.

Having thus described my invention, what I claim is:

A safety steering device comprising a plate adapted to be secured to the axle of an automobile, a lever pivotally mounted between its ends on the plate, said pivot being located nearer one end of said lever than its opposite end, the longer end of said lever having a slot formed therein for self adjusting engagement with the reach rod of the steering gear of an automobile, a curved lever pivotally mounted on the plate on each side of the first mentioned lever, said second mentioned levers having their curved outer edges at one end engaging opposite sides of the shorter end of the first mentioned lever, a spring connected with the opposite end of each of the second mentioned levers, adapted to retain each lever in engagement with the first mentioned lever, and stops mounted on the plate, adapted to limit the motion of the second mentioned levers.

In testimony whereof, I have hereunto subscribed my name this 20th day of January, 1915.

FRANK CULTER.

Witnesses:
A. KASSON,
W. THORNTON BOGERT.